(12) United States Patent
Duineveld et al.

(10) Patent No.: US 7,987,771 B2
(45) Date of Patent: Aug. 2, 2011

(54) BEVERAGE MAKER, AND PUMP UNIT AND CARTRIDGE FOR USE IN A BEVERAGE MAKER

(75) Inventors: Paulus Cornelis Duineveld, Drachten (NL); Fred Fraij, Drachten (NL); Marinus Christiaan Hansen, Odoornerveen (NL); Joeke Noordhuis, Hoogeveen (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 491 days.

(21) Appl. No.: 12/094,194

(22) PCT Filed: Nov. 29, 2006

(86) PCT No.: PCT/IB2006/054505
§ 371 (c)(1), (2), (4) Date: May 19, 2008

(87) PCT Pub. No.: WO2007/063503
PCT Pub. Date: Jun. 7, 2007

(65) Prior Publication Data
US 2008/0295699 A1    Dec. 4, 2008

(30) Foreign Application Priority Data

Nov. 30, 2005   (EP) ..................................... 05111505

(51) Int. Cl.
*A47J 31/057* (2006.01)
*H02K 44/00* (2006.01)
(52) U.S. Cl. .......... 99/302 R; 99/295; 417/50; 210/121; 210/258; 210/259; 210/266; 210/284
(58) Field of Classification Search ................ 99/302 R, 99/295; 417/50; 210/121, 258, 259, 266, 210/284
See application file for complete search history.

(56) References Cited

U.S. PATENT DOCUMENTS
5,039,402 A  *  8/1991  Himelstein ................... 210/121

FOREIGN PATENT DOCUMENTS
EP        1462042        9/2004
EP        1688075        8/2006
* cited by examiner

*Primary Examiner* — Shawntina Fuqua (57) ABSTRACT

A pump unit includes a reservoir for containing a liquid, a duct system for conveying the liquid, and a pumping section for subjecting the liquid to a pumping force. The initial filling of at least a portion of a duct for conveying the liquid from the reservoir to the pumping section is brought about under the influence of another force other than the pumping force, for example, under the influence of gravity.

33 Claims, 6 Drawing Sheets

BEVERAGE MAKER, AND PUMP UNIT AND CARTRIDGE FOR USE IN A BEVERAGE MAKER

The present invention relates to a pump unit for use in a beverage maker, comprising a reservoir for containing a fluid and a duct system having at least one duct which is connected to the reservoir, and which is adapted to conveying the fluid under the influence of a pumping force. The present invention also relates to a cartridge comprising at least the duct system of the pump unit, wherein the cartridge may be a disposable cartridge. Furthermore, the present invention relates to two types of beverage makers, namely a beverage maker comprising the pump unit, wherein the pump unit is an integral part of the beverage maker, and a beverage maker comprising a space for receiving the cartridge in which at least the duct system of the pump unit is situated.

A disposable cartridge comprising a pump unit such as mentioned in the preceding paragraph is known from EP 1 462 042. The reservoir of the known disposable cartridge is filled with a liquid. The duct system comprises a duct for conveying the liquid, a duct for conveying steam, and a duct for conveying air, which merge into a mixing duct for conveying a fluid that is obtained when the liquid, the steam and the air are put together. The mixing duct extends as a continuation of the duct for conveying the steam, while both the duct for conveying the liquid and the duct for conveying the air merge into the mixing duct at a side of the duct.

An end portion of the duct for conveying the steam is restricted, so that the steam is accelerated upon entry of the mixing duct. When the cartridge is operated and steam is supplied to the mixing duct by the duct for conveying the steam, a local underpressure is obtained in the mixing duct, as a result of which both the liquid and the air are sucked in the mixing duct. The principle of sucking in a fluid under the influence of a local underpressure that is obtained by successively conducting another fluid through a restriction and supplying this fluid to a relatively broad duct or chamber is known as the venturi principle.

The above-described disposable cartridge has some important advantages. In the first place, the use of the disposable cartridge is hygienic, because the liquid that is initially contained by the reservoir is only contacted by parts of the cartridge. Consequently, contact between the liquid and the beverage maker in which the disposable cartridge is placed is totally avoided, so that the beverage maker does not get contaminated by the liquid, and there is no need for a user to clean the beverage maker. In the second place, the disposable cartridge is easy to use. In particular, when the disposable cartridge is applied, preparations of a process of making a beverage only involve placing the cartridge in a beverage maker. Furthermore, a user does not need to dose the ingredients of the beverage, as the disposable cartridge contains the right amount of liquid. In the third place, the use of disposable cartridges yields a higher reliability of the operation of the beverage maker, as malfunctioning of the beverage maker due to contamination of the pump unit does not occur.

The disposable cartridge does not only have advantages, but has some disadvantages as well. An important disadvantage is related to the fact that the duct system is initially filled with air. When the steam is supplied to the duct system, air that is present in the duct for conveying the liquid is sucked in the mixing duct, followed by the liquid. Due to the fact that the density of the air is much lower than the density of the liquid, the local underpressure that is created in the mixing duct under the influence of the flow of the steam has a relatively poor pumping performance on the air. The difference between the pumping performances for air and liquid is further increased on the basis of the fact that the steam condensates less in air than in liquid. The relatively poor pumping action on the air leads to start-up problems, unless the pressure difference that is created is high enough for the air to be easily removed from the duct for conveying the liquid. However, in that case, the pressure difference is too high for pumping the liquid, resulting in a flow rate of the liquid that is too high.

The present invention offers a solution to the problem of either having start-up problems or a flow rate of the liquid that is too high, as the present invention provides a pump unit comprising a reservoir for containing a fluid and a duct system having at least one duct which is connected to the reservoir, and which is adapted to conveying the fluid under the influence of a pumping force; wherein the duct system is adapted to allowing for an initial filling of at least a portion of the duct with the fluid on the basis of another force than a pumping force.

According to the present invention, the pump unit is adapted to allowing for an initial filling of at least a portion of the duct with the fluid on the basis of another force than a pumping force. Thus, the pumping force is not needed for the purpose of pumping air from the duct, and may have a value that is adapted to pumping the fluid at a desired flow rate.

In an embodiment of the pump unit according to the present invention, at least a portion of the duct extends between the reservoir and a pumping section where the fluid is subjected to a pumping force during operation of the pump unit. Preferably, in this embodiment, the pump unit is adapted to allowing for an initial filling of this portion of the duct with the fluid on the basis of another force than a pumping force. In this way, it is ensured that as soon as the pumping section is operated, the fluid is pumped, wherein there is no need to pump air first, as there is no air present between the reservoir and the pumping section.

According to a first practical possibility, the pump unit is adapted to allowing for an initial filling of at least a portion of the duct with the fluid on the basis of a capillary force. This may be realized in various ways. For example, the duct may be locally restricted. In that case, it is advantageous if the duct comprises at least two subducts at the length along which the duct is locally restricted, so that the increase of the resistance to the flow of the fluid is kept as small as possible. According to another possibility, the duct is provided with an end portion having a smaller diameter than an adjoining portion.

A capillary rise of the fluid in the duct may be increased by decreasing a contact angle between the fluid and an inner surface of the duct, i.e. by improving a wetting of the fluid with the inner surface of the duct. For example, the contact angle may be decreased to below 60°. The contact angle may even be decreased to below 30°, and may for example be of the order of 10°. The decrease of the contact angle may be realized by choosing the material of the duct to be a material with which the fluid has a good wetting. It is also possible to manufacture the duct of any type of material, and to provide additional means which are adapted to ensuring a good wetting of the fluid with the duct. According to a first possibility, such means comprise a layer of a material that has a good wetting with the fluid, and that is applied to the inner surface of the duct. For example, the duct may be manufactured of a plastic, wherein the inner surface of the duct is coated with a metal. According to a second possibility, means for causing an electro-wetting effect between the fluid and the duct by applying a voltage may be provided. The electro-wetting effect involves a decrease of the contact angle of the fluid on the duct, whereby the wetting of the fluid with the duct and the capillary rise of the fluid in the duct are increased.

According to a second practical possibility, the pump unit is adapted to allowing for an initial filling of at least a portion of the duct with the fluid on the basis of gravity. In particular, the configuration of the reservoir and the duct allows for such an initial filling. This may be realized by positioning at least an upper portion of the reservoir at a higher level than at least a portion of the duct, so that the fluid is pulled in this portion of the duct under the influence of gravity.

Prior to the operation of the pump unit, an open connection between the reservoir containing the fluid and an outlet of the duct system is realized. Therefore, when the present invention is put to practice, and at least a portion of a duct of the duct system is filled with fluid before the pump unit is actually operated, there is a risk of the fluid prematurely flowing from the pump unit, unless precautionary measures are taken. In the context of the present invention, a number of such precautionary measures are proposed.

According to a first precautionary measure, a level of the outlet of the duct system is higher than a maximum level of fluid in the reservoir. In such a case, the fluid cannot flow from the outlet of the duct system, due to gravity. The pumping action of the pump unit is practically not hindered by this measure, as pressures generated by this gravity principle are much smaller than pressures generated during operation of the pump unit.

According to a second precautionary measure, which is applicable in case the duct system is arranged in a substrate, a portion of the substrate surrounding the outlet of the duct system comprises a material that has a poor wetting with the fluid. It is also possible that a layer of such a material is applied to the relevant portion of the substrate. By choosing a suitable material, a contact angle between the fluid and the substrate may be relatively large, even larger than 90°, so that the fluid is prevented from leaking away. For example, the material may be a plastic, such as a plastic containing a fluor component. An example of such a plastic is polytetrafluorethylene. Another example of a suitable plastic is polydimethylsiloxane.

In a practical embodiment, the layer of the material that has a poor wetting with the fluid is part of a removable seal for sealing the outlet of the duct system. In this way, it is achieved that when the sealing is removed, a non-wetting coating stays behind on the portion of the substrate surrounding the outlet.

According to a third precautionary measure, a ring-shaped portion of an inner surface of the duct is covered by a layer of a material that has a poor wetting with the fluid. A horizontal duct capillary filling is stopped when a contact angle of the fluid with the non-wetting layer is larger than 90°. Within the scope of the present invention, the position of the ring of non-wetting material may be chosen freely, and more rings of non-wetting material may be applied. When the pump unit is operated, the influence of the ring(s) on the pumping performance is negligible.

In principle, the pump unit may be any type of pump unit comprising a reservoir and a duct for conveying fluid that is pumped from the reservoir during operation of the pump unit. In many practical applications, the pump unit comprises at least two ducts for conveying a fluid, which are joined at a certain position in the pump unit. One of the ducts is connected to the reservoir, which may comprise a liquid such as coffee or milk. In such a case, another of the ducts may be adapted to conveying a fluid for pumping the liquid. A suitable fluid for pumping the liquid is steam or pressurized hot water. The ducts may be arranged such that a pumping action of the pumping fluid on the liquid is realized on the basis of the venturi principle, which has already been described in the foregoing. That does not alter the fact that this pumping action may be realized on the basis of another suitable principle, for example a principle which is known as the ejector principle. In general, according to this principle, a flow of a first fluid is generated under the influence of a local pressure that is obtained by allowing for a transfer of momentum from a flow of a second fluid to the first fluid.

At least a part of the pump unit according to the present invention, in particular at least the duct system of the pump unit, may be part of a cartridge for use in a beverage maker. Such a cartridge may be either durable or disposable. The pump unit may also be an integral part of a beverage maker.

The pump unit according to the present invention is suitable to be used in any type of process of making a beverage. For example, the beverage may be hot or cold, and the beverage may be made on the basis of one or more ingredients.

The applied fluids may be a liquid, a gas or a combination of a liquid and a gas. In case the fluid is a liquid, solid particles or polymers may be added to the fluid.

The present invention will now be explained in greater detail with reference to the figures, in which similar parts are indicated by the same reference signs, and in which.

Figure 1:
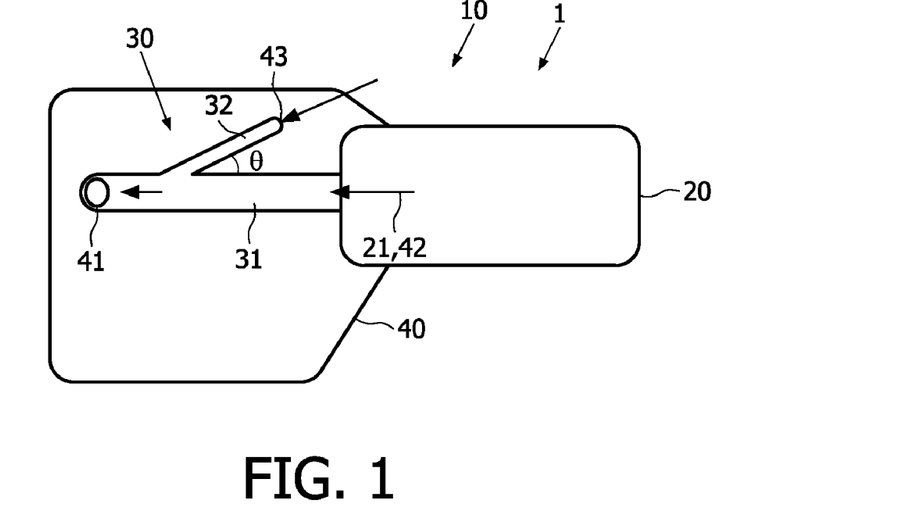
FIG. 1 diagrammatically shows a disposable cartridge for use in a beverage maker, comprising an ejector pump unit.

FIG. 1 diagrammatically shows a disposable cartridge 10 for use in a beverage maker, comprising a pump unit 1. The disposable cartridge 10 as shown is intended for single use, in other words, it is only possible to use the cartridge 10 one time in a process of preparing a beverage. After the cartridge 10 has been applied one time, it is no longer useful, and it is only fit to be thrown away.

Figure 2:
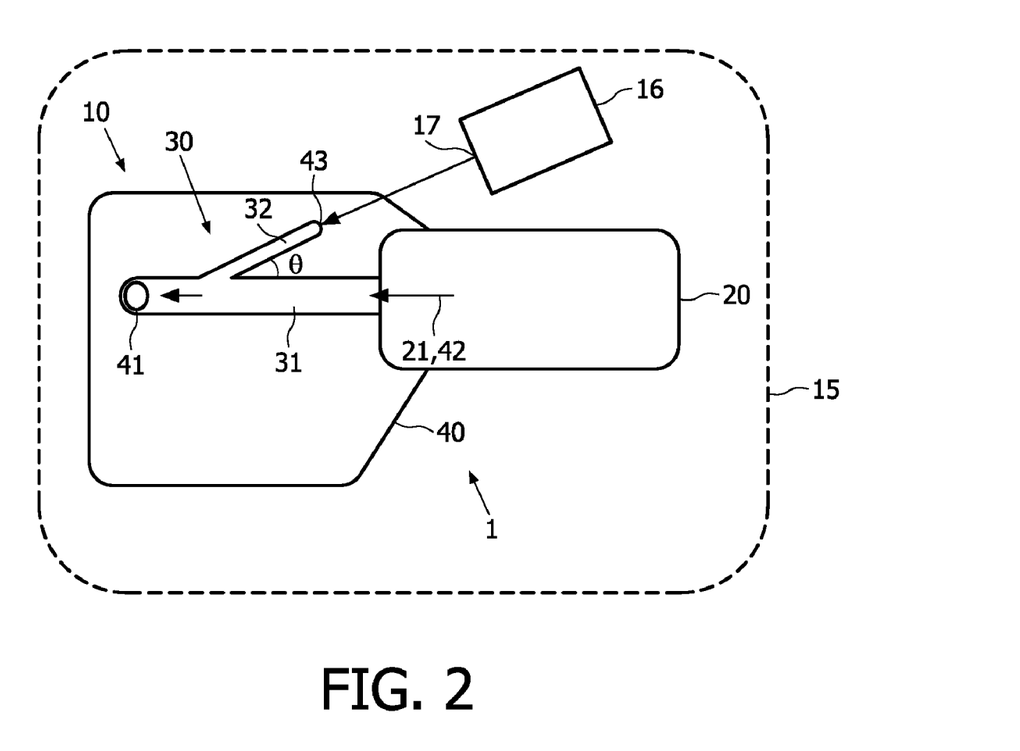
FIG. 2 diagrammatically shows a beverage maker and the disposable cartridge as shown in FIG. 1, wherein the disposable cartridge is placed in the beverage maker, and wherein the disposable cartridge is connected to a steam generator of the beverage maker.

FIG. 2 diagrammatically shows the disposable cartridge 10 and a beverage maker 15, wherein the disposable cartridge 10 is placed in the beverage maker 15, and wherein the disposable cartridge 10 is connected to a steam generator 16 of the beverage maker 15. In FIG. 2, the beverage maker 15 in general is represented by a rectangle of dashed lines.

The disposable cartridge 10 comprises a reservoir 20 containing a liquid, for example milk or liquid coffee extract. In the shown example, the reservoir 20 is shaped as an elongated sealed pouch, which may be manufactured by providing two foil sheets and interconnecting these foil sheets along their peripheries. That does not alter the fact that the reservoir 20 may be realized in another suitable way, for example as a recess in a surface of an element of the disposable cartridge 10, wherein the recess is covered by a foil sheet.

The pump unit 1 of the disposable cartridge 10 comprises a duct system 30 which is of the ejector type. Therefore, in the following, the pump unit 1 will be referred to as ejector pump unit 1. In the embodiment as shown, the duct system 30 comprises two ducts 31, 32. A first duct 31 extends between an outlet 21 of the reservoir 20 and an outlet 41 of the ejector pump unit 1. In the following, an end of the first duct 31 which is connected to the outlet 21 of the reservoir 20 will be referred to as liquid inlet 42 of the duct system 30. A second duct 32 merges into the first duct 31, at a position between the connection of the first duct 31 to the outlet 21 of the reservoir 20 and the outlet 41 of the ejector pump unit 1.

According to a practical possibility, the ducts 31, 32 are formed as recesses in a body 40 of the disposable cartridge 10. The recesses are covered by suitable means (not shown) for closing a top side of the recesses. An example of suitable closing means is a foil sheet. It is noted that the ducts 31, 32 do not necessarily need to comprise recesses and closing means, as long as the ducts 31, 32 are capable of conveying fluids. For example, the ducts 31, 32 might as well comprise tubes. However, it is advantageous to have recesses and foil sheets for covering the recesses, as a manufacturing process of such an arrangement may be easier than a process of assembling a number of tubes, given the fact that the cartridge body 40 may be formed by using injection molding techniques.

The shape of a cross-section of the ducts 31, 32 of the duct system 30 may be any suitable shape. For example, the cross-section may be circular, rectangular, square or hexagonal. An advantage of a circular cross-section is that a relatively low flow resistance of the duct 31, 32 is obtained.

A portion of the first duct 31 that is linked to the reservoir 20 extends at an angle θ with respect to the second duct 32, which is smaller than 90°. In the shown example, the angle θ is approximately 25°.

The disposable cartridge 10 is suitable to be applied for preparing a hot beverage such as hot milk or coffee. According to a practical possibility, during a process of preparing a beverage in which the disposable cartridge 10 is applied, the hot beverage is obtained by heating liquid initially contained by the reservoir 20 by means of steam. Therefore, the beverage maker 15 for receiving and operating the disposable cartridge 10 comprises the steam generator 16. In FIG. 2, it is shown that when the disposable cartridge 10 is placed in the beverage maker 15, the second duct 32 is connected to a steam socket 17 of the steam generator 16. In the following, an end of the second duct 32 which is connected to the steam socket 17 of the steam generator 16 when the disposable cartridge 10 is placed in the beverage maker 15 will be referred to as steam inlet 43 of the duct system 30.

In the following, a process of preparing a beverage, in which the disposable cartridge 10 and the beverage maker 15 are applied, will be described. For sake of clarity, directions of incoming flows and an outgoing flow are indicated by means of arrows in FIGS. 1 and 2.

Preparations of the process of preparing a beverage comprise the step of placing the disposable cartridge 10 in the beverage maker 15, and placing a receptacle such as a cup or the like underneath the outlet 41 of the ejector pump unit 1 of the cartridge 10. In the process of putting the disposable cartridge 10 in the right place in the beverage maker 15, a connection is established between the steam socket 17 of the steam generator 16 of the beverage maker 15 and the steam inlet 43 of the duct system 30 of the ejector pump unit 1 of the cartridge 10.

When the process of preparing the beverage is started, it is important that a liquid is allowed to flow from the reservoir 20 to the first duct 31, through the liquid inlet 42 of the first duct 31. Therefore, suitable means (not shown) are applied for piercing the foil of the reservoir 20 at an appropriate position. For example, such means may comprise a movably arranged pin.

The actual process of preparing the beverage starts when the liquid is present in the first duct 31 and the steam generator 16 is in operation, wherein steam enters the second duct 32, through the steam inlet 43. At the other end of the second duct 32, i.e. the end where the second duct 32 merges into the first duct 31, momentum is transferred from the flow of steam to the liquid, as a result of which a local underpressure is obtained. Under the influence of this local underpressure, the liquid is drawn out of the reservoir 20, wherein a flow of the liquid which is directed toward the outlet 41 of the ejector pump unit 1 is generated. In the process, the steam condenses in the liquid, so that the liquid is heated, and the effect of the underpressure is enhanced. In this way, a hot beverage is obtained, which exits the ejector pump unit 1 through the outlet 41.

During operation of the ejector pump unit 1, the steam is applied for the purpose of pumping the liquid from the reservoir 20 to the outlet 41, wherein a flow of the liquid is obtained under the influence of the flow of the steam. In particular, a local underpressure is obtained by a transfer of momentum from the flow of the steam to the liquid, and liquid is sucked in the first duct 31 under the influence of this underpressure. Additionally, condensation of the steam in the liquid takes place, as a result of which the liquid is heated. The principle according to which the pumping action of the steam on the liquid is obtained is the so-called ejector principle.

In order to have a good pumping action, it is important that the angle θ between the first duct 31 and the second duct 32 is smaller than 90°. In case the angle θ would be 90°, the flow of the steam would practically not lead to a flow of the liquid in the first duct 31, as in that case, the steam would not have a momentum in a direction in which motion of the liquid is allowed, i.e. a direction in which a longitudinal axis of the first duct 31 extends. In case the angle θ would be larger than 90°, the influence of the flow of the steam on the liquid in the first duct 31 would only cause the liquid to flow backward, i.e. in a direction toward the reservoir 20. When the liquid is milk, a good performance of the ejector pump unit 1 is obtained when the angle θ between the first duct 31 and the second duct 32 is about 25°, which does not imply that the angle θ may not be smaller or larger.

Figure 3:
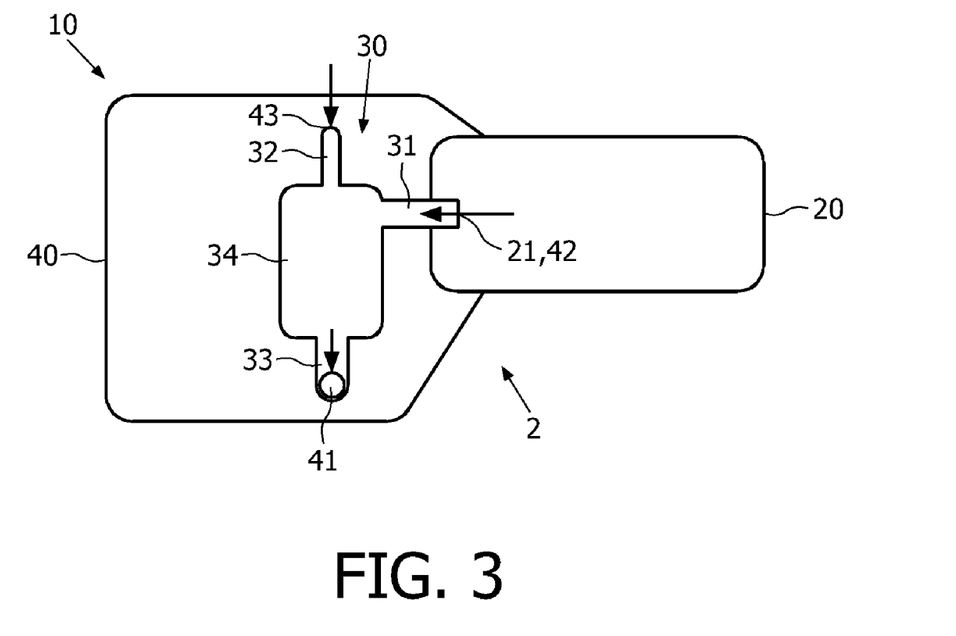
FIG. 3 diagrammatically shows a disposable cartridge for use in a beverage maker, comprising a venturi pump unit.

The duct system 30 of the ejector pump unit 1 as shown in FIGS. 1 and 2 is of the ejector type. It is noted that numerous possibilities of the number of ducts of the duct system 30 and the configuration of these ducts exist. Consequently, the duct system 30 may be of another type, for example of the venturi type. A pump unit 2 having such a duct system 30 is shown in FIG. 3. In the following, this pump unit 2 will be referred to as venturi pump unit 2.

The venturi pump unit 2 is part of a disposable cartridge 10, and resembles the ejector pump unit 1 to a large extent. In particular, the venturi pump unit 2 also comprises a reservoir 20 containing a liquid. Furthermore, the duct system 30 of the venturi pump unit 2 is also arranged in a body 40 of the cartridge 10.

The duct system 30 of the venturi pump unit 2 comprises three ducts 31-33 and a mixing chamber 34. A first duct 31 is connected to an outlet 21 of the reservoir 20, and merges into the mixing chamber 34. A second duct 32 merges into the mixing chamber 34 as well, and extends between a steam inlet 43 of the venturi pump unit 2 and the mixing chamber 34 of the duct system 30. A third duct 33 is an outlet duct of the duct system 30, and extends between the mixing chamber 34 and an outlet 41 of the venturi pump unit 2. Notable features of the duct system 30 are the fact that the first duct 31 and the second duct 32 extend at right angles with respect to each other and the fact that the second duct 32 and the outlet duct 33 are connected to the mixing chamber 34 at opposite sides of the mixing chamber 34.

The disposable cartridge 10 having the venturi pump unit 2 is suitable to be placed in a beverage maker 15 and to be applied for preparing a hot beverage such as hot milk or coffee, in a similar manner as has already been described with respect to the disposable cartridge 10 having the ejector pump unit 1.

In the following, a process of preparing a beverage, in which the disposable cartridge 10 having the venturi pump unit 2 is applied, will be described. For sake of clarity, directions of incoming flows and an outgoing flow are indicated by means of arrows in FIG. 3.

The actual process of preparing the beverage starts when the first duct 31 is filled with liquid from the reservoir 20 and steam is supplied to the mixing chamber 34, through the second duct 32. In the process, an underpressure is obtained in the mixing chamber 34, as a result of which the liquid is sucked in the mixing chamber 34. Furthermore, in the mixing chamber 34, the steam condenses in the liquid, so that the liquid is heated, and the effect of the underpressure is enhanced. In this way, a hot beverage is obtained, which exits the venturi pump unit 2 through the outlet 41.

During operation of the venturi pump unit 2, the steam is applied for the purpose of pumping the liquid from the reservoir 20 to the outlet 41, wherein a flow of the liquid is obtained under the influence of the flow of the steam. In particular, a depression with respect to the atmospheric pressure is created by supplying the steam to the mixing chamber 34, through the second duct 32, and liquid is sucked in the mixing chamber 34 under the influence of the underpressure thus obtained. Additionally, condensation of the steam in the liquid takes place, as a result of which the liquid is heated. The principle according to which the pumping action of the steam on the liquid is obtained is the so-called venturi principle.

In order to make a frothed beverage, the duct system 30 of the pump unit 1, 2 may comprise at least one air duct for supplying air. Preferably, such an air duct is closeable by means of a valve or the like, so that a user may choose whether to make a beverage with froth or without froth.

It is not necessary for the disposable cartridge 10 to be provided with a reservoir 20 containing the liquid to be used in the process of preparing the beverage. It is also possible that the beverage maker 15 comprises such a reservoir, wherein the first duct 31 is connectable to the reservoir, and wherein an open communication between the first duct 31 and the reservoir may be established upon receipt of the cartridge in the beverage maker 15. Furthermore, it is possible that an external reservoir is used, which may even be a carton containing the liquid, and that a hose for putting the first duct 31 in communication with the liquid in the external reservoir is applied.

In principle, it is possible to apply a cartridge which is intended for more uses than just a single one. Such a cartridge may be of the same design as the shown disposable cartridges 10. In case the cartridge comprises a reservoir 20, this reservoir 20 is arranged such as to be refillable, or this reservoir 20 comprises a quantity of liquid which is adapted to being used for a predetermined number of uses, wherein the number is more than one. In case the cartridge does not have a reservoir 20, it is up to the user to decide how many times the cartridge will be used before it is thrown away.

The beverage maker 15 may be arranged such as to supply different quantities of beverage, depending on a choice of the user. For example, the user may choose to have a single quantity of beverage or a double quantity of beverage. In such a case, the reservoir 20 of the disposable cartridge 10 may comprise a double quantity of liquid, so that the disposable cartridge 10 is suitable to be used two times for the purpose of preparing a single quantity of beverage or one time for the purpose of preparing a double quantity of beverage.

The liquid that is pumped from the reservoir 20 during operation of the pump unit 1, 2 may be a pure liquid, but may also contain particles. According to another option, storage means containing particles are provided, wherein these storage means are adapted to supplying particles to the liquid. The particles may for example be chocolate powder.

It is not necessary to use a disposable cartridge 10 in a process of preparing a beverage, although this way of preparing a beverage has important advantages. One of these advantages is that the applied liquid and the obtained beverage only contact elements of the disposable cartridge 10, so that the beverage maker 15 does not get contaminated. This is especially important in case the liquid is apt to go bad relatively quickly, which is the case when the liquid comprises milk, for example.

It is possible to have a pump unit 1, 2 which is fixedly arranged in the beverage maker 15. In such a case, the beverage maker 15 may comprise a refillable reservoir for containing the liquid. According to another possibility, suitable means such as a hose for putting the pump unit 1, 2 in communication with liquid in an external reservoir are provided. The beverage maker 15 may also be adapted to receiving disposable reservoirs containing the liquid.

Figure 4:
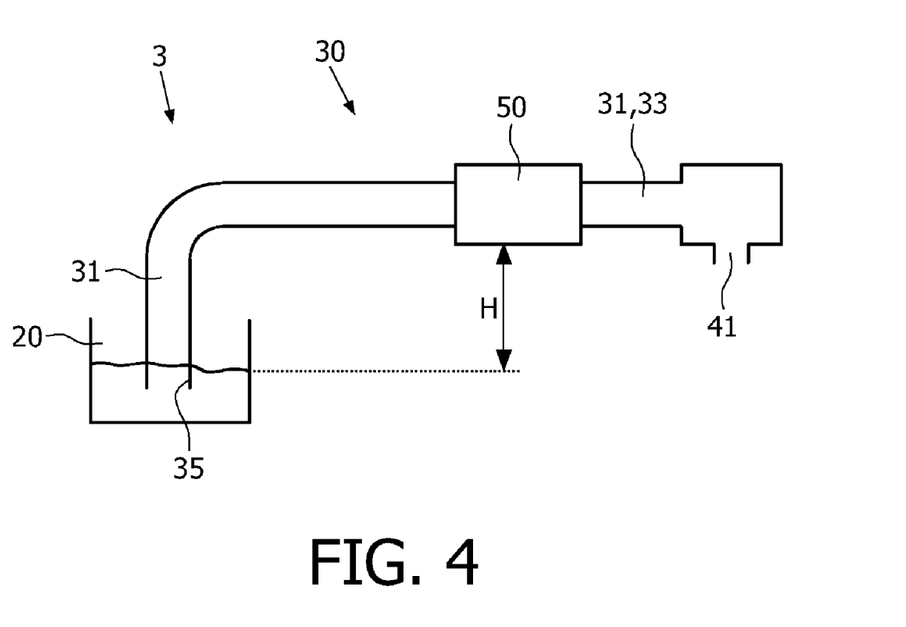
FIG. 4 illustrates a start-up situation of a pump unit according to the state of the art.

According to the state of the art, a problem that is associated with a pump unit 1, 2 comprising a reservoir 20 and at least one duct 31 connected to the reservoir 20 is related to a start-up situation of the operation of the pump unit 1, 2, and is explained in the following with reference to FIG. 4. In this figure, a pump unit 3 is diagrammatically shown, wherein a portion of the duct system 30, in particular a portion where a first duct 31 for conveying liquid drawn from the reservoir 20 and a second duct 32 (not shown in FIG. 4) for conveying a pumping fluid such as steam are joined, is depicted like a box. In the following, this portion of the duct system 30 will be referred to as pumping section 50. The pumping section 50 may be adapted to pumping the liquid by means of the pumping fluid in any suitable way. In case the pump unit 3 is an ejector pump unit, the second duct 32 merges into the first duct 31, at an angle θ, and an outlet duct of the pump unit 3 is constituted by an end portion of the first duct 31. In case the pump unit 3 is a venturi pump unit, both the first duct 31 and the second duct 32 merge into a mixing chamber 34, and an outlet duct of the pump unit 3 is an outlet duct 33 extending between the mixing chamber 34 and an outlet 41 of the pump unit 3. In the shown example, a level at which the pumping section 50 is arranged is higher than a level of the liquid in the reservoir 20. In FIG. 4, a height H of the pumping section 50 with respect to the level of the liquid in the reservoir 20 is indicated by means of a double-headed arrow.

Figure 5:
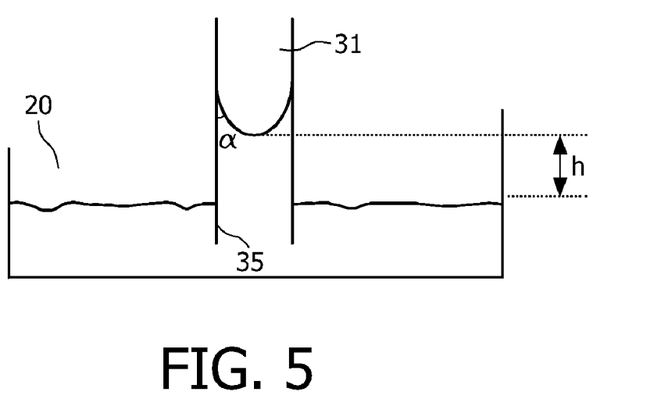
FIG. 5 illustrates the phenomenon of capillary rise of a liquid in a duct.

In a start-up situation of the pump unit 3, the duct system 30 is filled with air, with the exception of an end section of the first duct 31, which is inserted in the liquid that is present in the reservoir 20. Due to capillary action, a level of the liquid in this end section of the first duct 31 is somewhat elevated with respect to the overall level of the liquid in the reservoir 20. This is illustrated by FIG. 5, in which the reservoir 20 and the relevant end section of the first duct 31 are diagrammatically shown. In this figure, a height h of the level of the liquid in the first duct 31 with respect to the level of the liquid in the reservoir 20 is indicated by means of a double-headed arrow.

In general, the height h of the level of the liquid in the first duct 31 with respect to the level of the liquid in the reservoir 20 is determined by a balance of capillary pressure and hydrostatic pressure. For a circular capillary, a relation between this height h and the pressures as mentioned is as follows:

$$\frac{2\sigma\cos\alpha}{r} = \rho g h \Rightarrow h = \frac{2\sigma\cos\alpha}{\rho g r}$$

where r is the radius of the capillary, σ is the surface tension of the liquid, ρ is the density of the liquid, α is the contact angle between the liquid and an inner surface 35 of the first duct 31, and g is the acceleration of gravity. For sake of completeness, it is noted that a similar relation can be obtained for a non-circular duct.

In case of the liquid being milk, the surface tension σ is close to the surface tension σ of water, which is 0.07 N/m, the density ρ is 1000 kg/m³, and an estimated value of the contact angle α is 60°. A practical value of the diameter of the first duct 31 is 3 mm. In such a case, a typical height h of 5 mm is obtained, which is only a small fraction of a practical value of a total height H of the first duct 31 until the pumping section 50, which is 40 mm. Hence, the liquid in the reservoir 20 does not spontaneously fill the portion of the first duct 31 extending between the reservoir 20 and the pumping section 50 on the basis of a capillary force.

As has already been noted, in a start-up situation of the pump unit 3, the duct system 30 is filled with air. As soon as a pumping action is carried out, a negative pressure Δp with respect to the atmospheric pressure is generated. Under the influence of this pressure difference Δp, the height h of the level of the liquid in the first duct 31 with respect to the level of the liquid in the reservoir 20 is increased. On the basis of a balance of forces, the following relation is obtained:

$$p_a - \Delta p - \frac{2\sigma\cos\alpha}{r} + \rho g h = p_a \Rightarrow h = \frac{2\sigma\cos\alpha}{\rho g r} + \frac{\Delta p}{\rho g}$$

where $P_a$ is the atmospheric pressure.

In order to overcome the gravity and pump the liquid from the reservoir 20 to the pumping section 50, the pressure difference Δp has to be at least $$\Delta p = \rho g H - \frac{2\sigma\cos\alpha}{r}$$

The pressure difference Δp needs to be equal to or above the minimum value as indicated above. When the values of the various parameters as mentioned above are applied, the minimum value is typically 0.004 bar.

Shortly after the operation of the pump unit 3 has started, liquid rather than air is pumped. Due to the fact that the density of the liquid is considerably larger than the density of the air, a strong increase in the generated pressure difference Δp results. In case the pumping fluid is steam, the pumping performance is further improved as a consequence of the condensation of the steam in the liquid. It is clear that a pump with a high performance is needed in order to be capable of pumping away the air during a start-up of the pump unit 3, and that the performance of this pump is unnecessarily high when the liquid is pumped. In many cases, the performance of the pump is too high, and a flow rate of the liquid that is too high is obtained.

The present invention offers a solution to the problem of conflicting needs, i.e. a need for a pump with a high performance for guaranteeing a safe operation of the pump unit 3 on the one hand, including a safe start-up, and a need for a pump with a lower performance for realizing a flow of the liquid at a limited flow rate on the other hand. In particular, the present invention provides measures for ensuring that at least the portion of the first duct 31 extending between the reservoir 20 and the pumping section 50 is completely filled with liquid before operation of the pump unit 3 is started.

In the first place, the present invention provides measures for realizing an initial filling of the portion of the first duct 31 extending between the reservoir 20 and the pumping section 50 with liquid on the basis of a capillary force. From the relation $$h = \frac{2\sigma\cos\alpha}{\rho g r}$$

it follows that the height h of the liquid in the first duct 31 can be increased by decreasing the radius r of the duct 31 and/or by decreasing the contact angle α of the liquid with the inner surface 35 of the duct 31.

Figure 6:
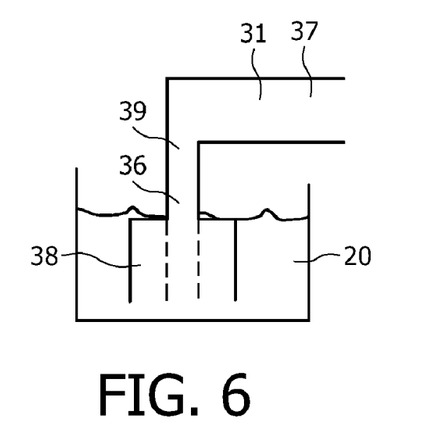
FIG. 6 illustrates a first possible realization of a restriction of a portion of a duct that is connected to a reservoir of a pump unit according to the present invention.
Figure 7:
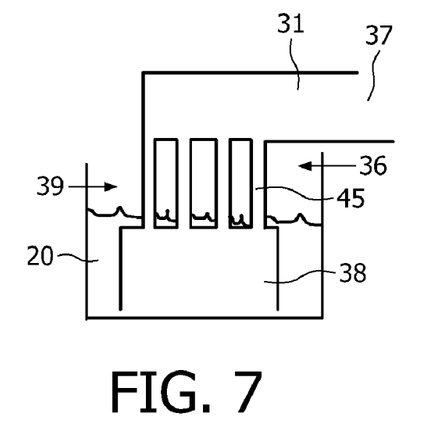
FIG. 7 illustrates a second possible realization of a restriction of a portion of a duct that is connected to a reservoir of the pump unit according to the present invention.

FIGS. 6 and 7 illustrate possible embodiments of the first duct 31, in which a decrease of the radius r of a vertically oriented portion 36 of the duct 31 is realized. There is no need for a decrease of the radius r of a horizontally oriented portion 37 of the duct 31, as in such a portion 37, the capillary effect is not influenced by gravity.

In FIG. 6, a portion of a first possible embodiment of the first duct 31 is shown, wherein a radius r of the vertically oriented portion 36 is decreased, in other words, wherein the vertically oriented portion 36 is restricted. For example, in case cosα has approximately a value of 0.5, a reduction in duct diameter to typically 1 mm gives a capillary rise to approximately 14 mm. For sake of completeness, it is noted that a section 38 of the first duct 31 that is below the level of the liquid in the reservoir 20 may have a larger radius, and that, in principle, the decrease of the radius is only relevant in respect of the other section 39 of the vertically oriented portion 36 of the duct 31. In this way, it is achieved that an intake of the liquid in the first duct 31 is not hindered in any way. Nevertheless, the section 38 having the larger radius may be omitted. The option of not having this section 38 is illustrated in FIG. 6 by means of dashed lines indicating an extension of the vertically oriented portion 36 of the first duct 31 without a change of diameter.

Within the scope of the present invention, it is possible that the reservoir 20 is initially sealed by a foil or the like, in order to prevent the liquid from decay. In that case, it is advantageous if an end of the first duct 31 is adapted to opening the seal, or if additional means are provided for doing so.

Instead of a single narrowed section 39, the vertically oriented portion 36 of the first duct 31 may comprise a number of subducts 45. In FIG. 7, by way of example, a portion of a first duct 31 having four subducts 45 is shown. An important advantage of this embodiment of the first duct 31 is that the decrease of the radius r of the duct 31 is realized without an undesirable increase of a flow resistance of the duct 31, as a sum of the cross-sections of the subducts 45 may be equal to or just a little bit smaller than the cross-section of the original duct 31.

A decrease of the contact angle α of the liquid with the inner surface 35 of the duct 31, i.e. an improvement of the wetting of the liquid with the inner surface 35 of the duct 31, which leads to an increased capillary rise of the liquid in the first duct 31, may be realized in various manners. This measure of improving the wetting of the liquid with the inner surface 35 of the duct 31 may be applied as a single measure for the purpose of increasing the capillary rise of the liquid in the duct 31, but may as well be applied in addition to the above-described measure of decreasing the radius r of the duct 31.

In many cases in which the pump unit 3 is arranged as a part of a disposable cartridge 10, in view of cost reasons, the duct system 30 of the pump unit 3 is arranged in a plastic cartridge body 40. It is known that water does not have a very good wetting with plastics. In view of this known fact, the wetting of the liquid with the inner surface 35 of the duct 31 can be improved by choosing a suitable material for the cartridge body 40. Such a material may be a plastic having a smaller contact angle α to the liquid, and may for example be a plastic having an improved crystallinity. Such a plastic may be manufactured by molding a polymer against gold, for example.

It is not necessary that the entire body 40 of the cartridge 10 is manufactured of a material with which the liquid has a good wetting. It is sufficient if a relevant length of the inner surface 35 of the first duct 31 is manufactured of such a material, or if a relevant length of the inner surface 35 of the first duct 31 is covered by a layer of such a material. For example, it is known that, in general, metals have a much higher surface energy than plastics, and that, as a consequence, metals give a better wetting of the liquid. In view of this known fact, it is a feasible option to manufacture at least the relevant length of the inner surface 35 of the first duct 31 of a metal, or to apply a thin metal coating on at least the relevant length of the inner surface 35 of the first duct 31 in case this inner surface 35 comprises a plastic material. Furthermore, various other materials or coatings of materials for decreasing the contact angle α may be used. For example, the inner surface 35 may be covered with an inorganic coating like a sol-gel coating.

When the contact angle α is decreased to 25° or an even lower lower value, cosα may be 0.9 or a higher value. In such a case, the capillary rise can be increased to a height h that is close to 30 mm. In case the height H of the pumping section 50 with respect to the level of the liquid in the reservoir 20 is lower than the capillary rise, for example 20 mm or lower, it is guaranteed that the portion of the first duct 31 extending between the reservoir 20 and the pumping section 50 is initially filled with the liquid under the influence of the capillary force. The dimensions as mentioned are very realistic, especially in respect of actual disposable cartridges 10.

It is also possible to realize a decrease of the contact angle α of the liquid with the inner surface of the first duct 31 on the basis of an effect known as electro-wetting effect. For example, this effect is described in U.S. Pat. No. 6,438,211. In general, by applying a voltage, the contact angle α of a liquid on a substrate can be decreased. Hence, in this manner, the capillary rise of liquid in a duct 31 can be increased.

In the second place, the present invention provides measures for realizing an initial filling of the portion of the first duct 31 extending between the reservoir 20 and the pumping section 50 with liquid on the basis of gravity.

Figure 8:
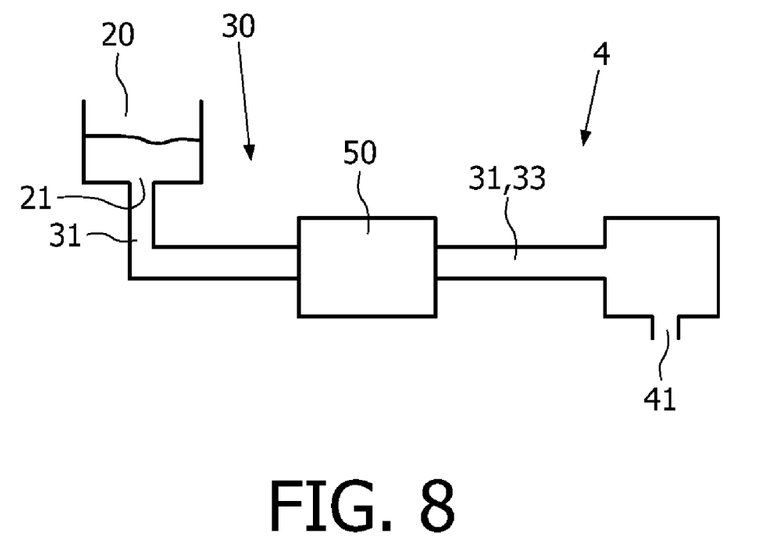
FIG. 8 diagrammatically shows an embodiment of a pump unit according to the present invention, in which a configuration of a reservoir and a duct connected to the reservoir is adapted to realizing an initial filling of the duct with a liquid supplied by the reservoir under the influence of gravity.

In FIG. 8, a pump unit 4 having a reservoir 20 and a pumping section 50 is shown, wherein the reservoir 20 is at a higher level than the pumping section 50 and a duct 31 extending between the reservoir 20 and the pumping section 50. Thus, when an open connection between the reservoir 20 and the duct 31 is realized, the duct 31 is filled with liquid from a bottom portion of the reservoir 20, under the influence of gravity.

Figure 9:
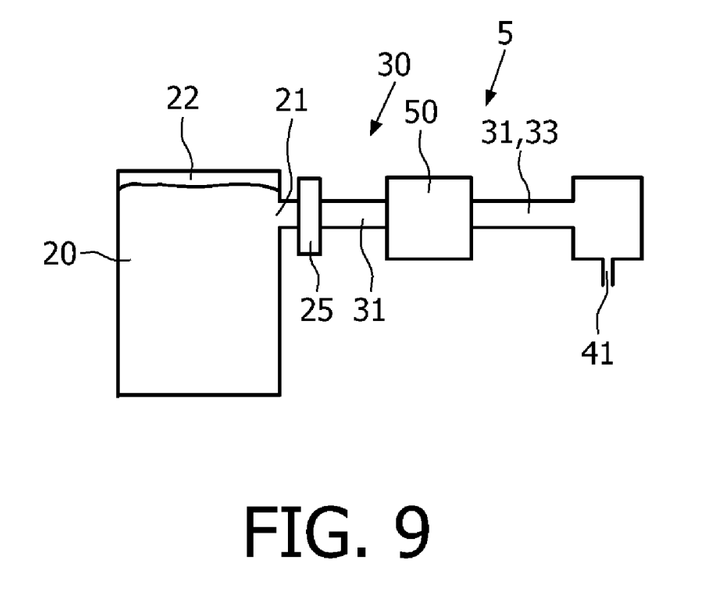
FIG. 9 diagrammatically shows an alternative of the embodiment of the pump unit according to the present invention as shown in FIG. 8.

In FIG. 9, a pump unit 5 having a reservoir 20 and a pumping section 50 is shown, wherein most of the reservoir 20 is at a lower level than the pumping section 50 and a duct 31 extending between the reservoir 20 and the pumping section 50, but wherein a top portion 22 of the reservoir 20 is still positioned at a higher level than the duct 31 and the pumping section 50. Hence, when an open connection between the reservoir 20 and the duct 31 is realized, the duct 31 is filled with liquid from the top portion 22 of the reservoir 20, under the influence of gravity.

When the present invention is put to practice, and an initial filling of at least a portion of at least one duct 31 of the duct system 30 of the pump unit 1-5 is obtained before an actual operation of the pump unit 1-5 under the influence of a pumping force is started, there may be a risk of liquid prematurely dripping from the outlet 41 of the pump unit 1-5. Therefore, the present invention also provides measures aimed at guaranteeing that the liquid will not leak away. These measures may also be applied in situations in which there is no initial filling, for example for the purpose of preventing dripping after a pump unit has been operated.

A first measure will be explained on the basis of FIG. 4. When the reservoir 20 is positioned with respect to the outlet 41 of the pump unit 3 in such a way that a level of the liquid in the reservoir 20 is lower than a level of the outlet 41, the liquid can not drip from the outlet 41, due to gravity. It is noted that during operation of the pump unit 3, the pumping performance will practically not be decreased, as the pressures generated under the influence of gravity are much lower than the pressures generated during operation of the pump unit 3.

In a preferred embodiment, a distance between the pumping section 50 and the outlet 41 is relatively short, such that a volume of liquid which is initially present in the duct system 30 between the pumping section 50 and the outlet 41 is much smaller than a total volume of liquid in the reservoir 20. This is important in case the liquid is not only pumped in the pumping section 50, but also heated or cooled, as in such case, it is important that the volume of the liquid which is not heated or cooled is relatively small.

The liquid in the reservoir 20 can be prevented from decay by placing a seal 25 on the outlet 21 of the reservoir 20. In that case, the seal 25 needs to be opened before the operation of the pump unit 1-5 is started. A seal 25 is diagrammatically depicted in FIG. 9.

Figure 10:
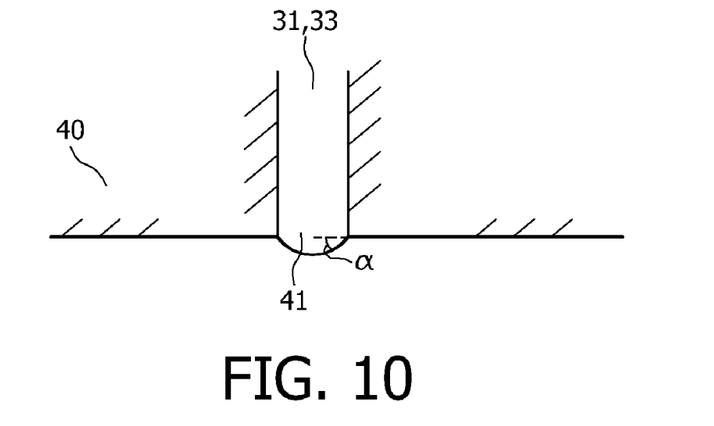
FIG. 10 illustrates a first precautionary measure for preventing a liquid from dripping from an outlet of the pump unit according to the present invention.

Another measure aimed at guaranteeing that the liquid will not prematurely leak away through the outlet 41 will now be explained on the basis of FIG. 10. This measure involves an adaptation of wetting properties of a portion of the body 40 surrounding the outlet 41. In particular, the liquid is prevented from dripping in case the wetting properties of the portion of the body 40 are such that a contact angle $\alpha$ of the liquid with this portion is relatively large, preferably larger than 90°. This is realized by choosing a material with which the liquid has a poor wetting. Examples of a suitable material in this respect are plastic materials, for example a plastic containing a fluor component such as polytetrafluorethylene, or polydimethylsiloxane.

The material of the portion of the body 40 surrounding the outlet 41 may be a non-wetting material, but this is not necessary, as the drip stopping effect is also obtained in case this portion of the body 40 is covered by a coating of a non-wetting material. In particular, such a coating contains materials that cause the contact angle $\alpha$ with the liquid to be relatively large, preferably larger than 90°. Examples of suitable materials in this respect are dimethyldichlorosilane and aminopropyltrimethoxysilane. Also, materials containing a fluor component may be applied, for example fluoro silane. It is also possible that fluor plasma is utilized. It is noted that the coatings may be very thin; even a mono-layer is sufficient for the purpose of obtaining the desired increase of the contact angle $\alpha$. According to an advantageous option, the coating is initially part of a seal that is positioned at the outlet 41. When the seal is removed, the non-wetting coating remains around the outlet 41.

It is noted that the non-wetting material can only accommodate a pressure difference of $2\sigma/r$. On the basis of the relation $$h = \frac{2\sigma\cos\alpha}{\rho g r}$$

it is found that when the outlet 41 is positioned below a height h of $2\sigma/\rho g r$ with an initial level of the liquid in the reservoir 20, the anti-wetting coating will not be sufficient, and dripping of the liquid from the outlet 41 is not prevented. However, this height h is of the order of a few centimeters, and a proper position of the outlet 41 with respect to the initial level of the liquid in the reservoir 20 may be realized in practice, especially in a disposable cartridge 10.

Figure 11:
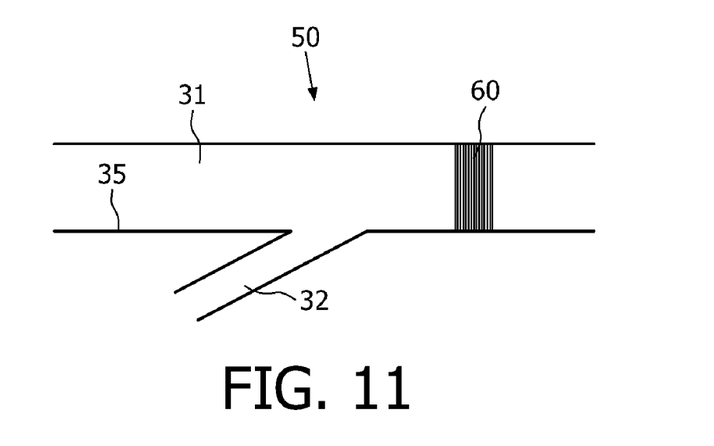
FIG. 11 illustrates a second precautionary measure for preventing a liquid from dripping from an outlet of the pump unit according to the present invention.

The non-wetting coating does not necessarily need to be applied around the outlet 41. It is also possible that the coating is applied to a ring-shaped portion of the inner surface 35 of the duct(s) 31, 33 for conveying the liquid. In FIG. 11, a pumping section 50 of the ejector type is shown, wherein a ring-shaped coating 60 of anti-wetting material is arranged on the inner surface 35 of the first duct 31, at a position behind the place where the second duct 32 merges into the first duct 31. A horizontal duct capillary filling will stop in case the contact angle $\alpha$ of the liquid with the inner surface 35 of the duct 31, 33 is larger than 90°. The applied materials can be similar to the non-wetting materials as described in the foregoing.

The ring 60 of non-wetting material can be arranged anywhere in the duct 31, 33. Furthermore, two or even more of such rings 60 may be present in the duct system 30. When the pump unit 1-5 is operated, the influence of the ring(s) 60 on the pumping performance is negligible.

Other measures for preventing the liquid from prematurely dripping from the outlet 41 of the pump unit 1-5, in particular measures which are based on differences of the conditions during an initial filling of at least a portion of at least one duct 31 of the duct system 30 and a pumping action, are explained on the basis of FIGS. 12-15. Among other things, such measures may be based on the following two differences:

1) The forces prevailing during a pumping action are much larger than the forces prevailing during an initial filling.

2) In case steam or another relatively hot fluid is used as a pumping fluid, the temperature prevailing in certain portions of the duct system 30 during a pumping action are much higher than the temperature prevailing in these portions of the duct system 30 during an initial filling.

In view of this, the measures may involve the following:

a) barriers for stopping a flow of liquid, which are at least partially removed under the influence of the impacting force exerted by the flow during a pumping action;

b) barriers for stopping a flow of liquid, which are at least partially removed under the influence of the increased temperature prevailing during a pumping action; or c) a combination of both types of barriers as mentioned under the above points (a and b).

It will be understood that the measures according to points b and c are only applicable in case steam or another relatively hot fluid is used in the process of making the beverage, or in case the temperature is increased in another manner.

Figure 12:
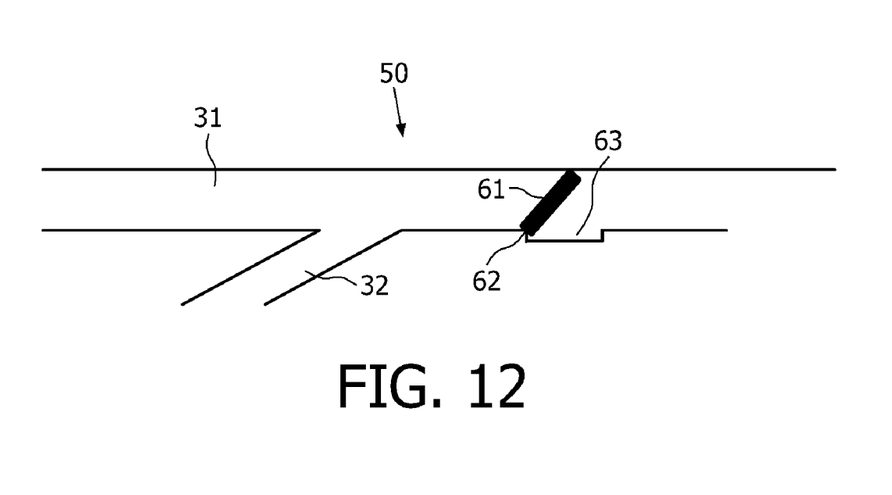
FIG. 12 illustrates a third precautionary measure for preventing a liquid from dripping from an outlet of the pump unit according to the present invention.

In FIG. 12, a measure making use of the difference between the forces prevailing during the initial filling and the pumping action is illustrated. This measure involves the application of a removably arranged obstruction in the duct system 30. In particular, in FIG. 12, a pumping section 50 of the ejector type is shown, wherein a valve door 61 is pivotably arranged about a pivot axis 62, at a position behind the place where the second duct 32 merges into the first duct 31.

The valve door 61 is movable between a closed position and an opened position, wherein, in the closed position, the valve door 61 blocks the first duct 31, and wherein, in the opened position, the valve door 61 leaves the first duct 31 free. Consequently, in the closed position of the valve door 61, a flow of liquid is hindered, so that the liquid can not reach the outlet 41. In FIG. 12, the valve door 61 is shown in the closed position.

Starting from the closed position, the valve door 61 is put to the opened position under the influence of forces exceeding a certain threshold. The forces prevailing during the initial filling of the duct system 30 are relatively low, below this threshold. Therefore, these forces are not capable of putting the valve door 61 to the opened position. However, during the pumping action, the forces prevailing in the duct system 30 are relatively high, above the threshold, and the valve door 61 is put to the opened position, and is kept in that position, at least as long as the pumping action lasts.

Preferably, the first duct 31 is provided with a protrusion 63 for receiving the valve door 61 in the opened position. In this way, it is realized that the flow of fluid in the first duct 31 is not hindered at all during the pumping action, as the valve door 61 is completely out of the way.

When the pump unit 1-5 is intended to be used for more than one time, it is advantageous if means are provided for putting the valve door 61 back to the closed position after a pumping action has taken place. Such means may comprise a spring, for example. By putting the valve door 61 back to the closed position, dripping of liquid from the outlet 41 is stopped, or at least minimized.

Figure 13:
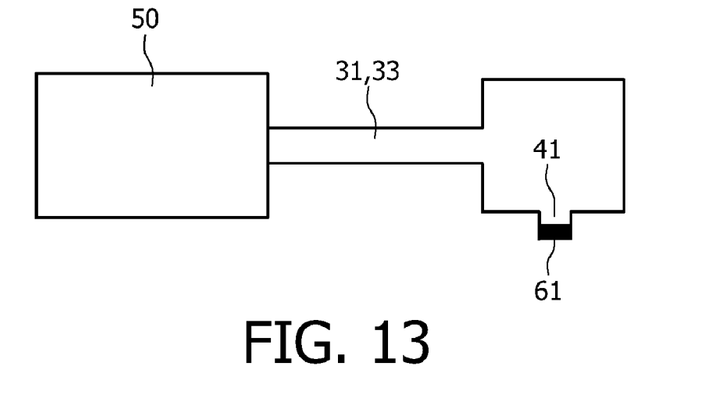
FIG. 13 illustrates a fourth precautionary measure for preventing a liquid from dripping from an outlet of the pump unit according to the present invention.

Within the scope of the present invention, the obstruction may be present at any suitable position in the pump unit 1-5. For example, the obstruction may be positioned at the outlet 41 or near the outlet 41. This option is illustrated by FIG. 13, wherein the obstruction is indicated by the reference numeral 61, like the valve door 61 in FIG. 12.

Furthermore, a removably arranged element may be provided, which is removed from the pump unit 1-5 under the influence of the forces which are exerted during a pumping action. Such an element may be made of a consumable material for humans, so that it can land in a cup for receiving the beverage and be part of in the beverage. The element may comprise a flavoring agent or a foam improving agent, for example.

Figure 14:
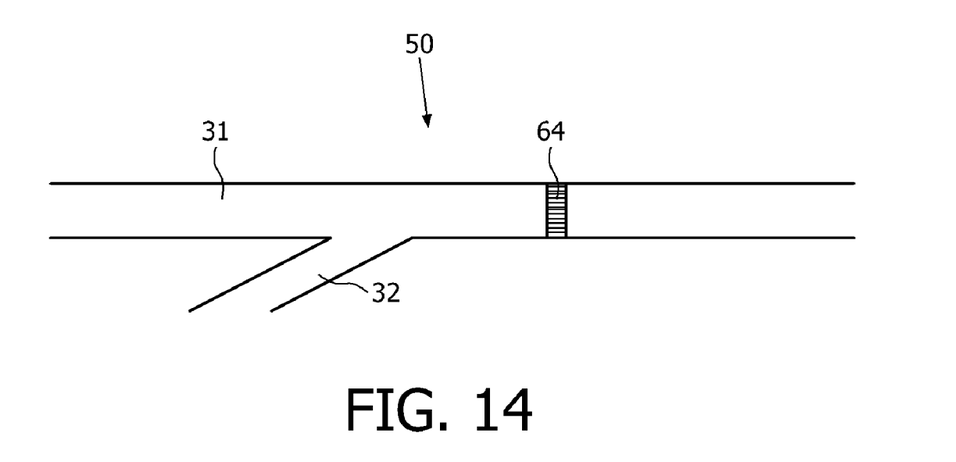
FIG. 14 illustrates a first possible realization of a fifth precautionary measure for preventing a liquid from dripping from an outlet of the pump unit according to the present invention.

In FIG. 14, a measure making use of the difference between the temperatures prevailing during the initial filling and the pumping action is illustrated. This measure involves the application of an obstruction 64 that dissolves at relatively high temperatures. Hence, this measure is applicable in case a hot beverage is prepared by using a hot fluid such as steam. In particular, in FIG. 14, a pumping section 50 of the ejector type is shown, wherein a dissolvable obstruction 64 is arranged at a position behind the place where the second duct 32 merges into the first duct 31.

During initial filling, the temperature in the duct system 30 is at ambient temperature or even lower, for example when the liquid has been stored in a cool place. Under those circumstances, the obstruction 64 remains as it is, so that the liquid can not flow beyond the obstruction 64. However, when a pumping action is initiated, and steam is supplied through the second duct 32, the temperature rises, and the obstruction 64 is caused to dissolve. From that moment on, the fluid is allowed to flow freely toward the outlet 41.

Figure 15:
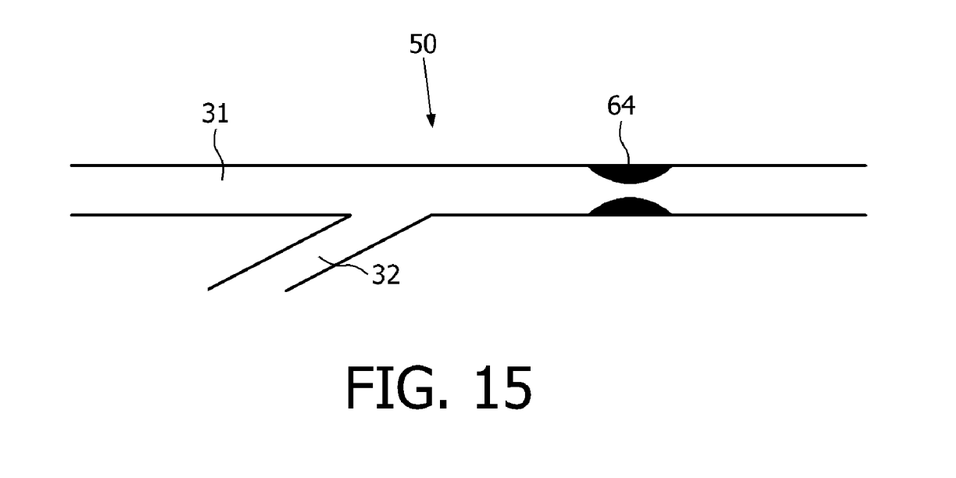
FIG. 15 illustrates a second possible realization of the fifth precautionary measure for preventing a liquid from dripping from an outlet of the pump unit according to the present invention.

The dissolvable obstruction 64 may comprise a material such as a flavoring agent or a foam improving agent. Furthermore, the obstruction 64 may have one or more holes. An obstruction 64 having a central hole is shown in FIG. 15. Also, the obstruction 64 may be arranged at any suitable position in the pump unit 1-5. For example, it is also possible that the obstruction 64 is arranged at the outlet 41 or near the outlet 41.

It is noted that all of the shown embodiments of the pump unit 1-5 according to the present invention comprise a single outlet 41. However, that does not alter the fact that the pump unit 1-5 may comprise more than one outlet 41. An advantage of providing a plurality of outlets 41 is that the diameter of the individual outlets 41 may be relatively small. In this way, a higher flow resistance is obtained, wherein the flow resistance may even be high enough to prevent fluid from leaking away through the outlet 41.

The present invention is applicable in any type of beverage making appliance, and provides a feasible solution to problems which may occur when a process of pumping at least one beverage ingredient is started. In particular, the present invention involves an initial filling of at least a portion of a duct 31, 33 of a duct system 30 of a pump unit 1-5, before the pumping action is initiated. Furthermore, in order to prevent a situation in which the initial filling of the duct 31, 33 leads to a premature loss of fluid through an outlet 41 of the duct system 30, the present invention proposes measures aimed at ensuring that the fluid remains in the duct system 30 as long as a pumping action on the basis of a pressure difference does not yet occur.

It will be clear to a person skilled in the art that the scope of the present invention is not limited to the examples discussed in the foregoing, but that several amendments and modifications thereof are possible without deviating from the scope of the present invention as defined in the attached claims.

In the foregoing, a pump unit 1-5 has been disclosed, which comprises a reservoir 20 for containing a liquid, a duct system 30 for conveying the liquid and a pumping section 50 for subjecting the liquid to a pumping force. In general, a pumping force may be a force which is obtained as a result of a pressure difference. For example, in the pumping section 50, the liquid may be pumped under the influence of a flow of another fluid such as steam. Initially, in a pump unit 3 according to the state of the art, the duct system 30 is filled with air. This causes problems at the start of the operation of the pump unit 3, or, in case the applied pumping force is high enough to prevent such problems, this leads to a flow rate of the liquid that is too high. This problem is solved by bringing about an initial filling of at least a portion of a duct 31 for conveying the liquid from the reservoir 20 to the pumping section 50, under the influence of another force than a pumping force, for example under the influence of a capillary force or gravity.

The invention claimed is:

1. A pump unit for use in a beverage maker, comprising:
   a reservoir for containing a fluid;
   a duct system having at least one duct which is connected to the reservoir, and which is adapted to conveying the fluid under influence of a pumping force; wherein the pump unit is adapted to allowing for an initial filling of at least a portion of the duct with the fluid based on a further force other than the pumping force; and
   wetting means adapted to ensuring a better wetting of the fluid with the duct than wetting of surrounding material, wherein the wetting means comprise means for causing an electro-wetting effect between the fluid and the duct by applying a voltage.

2. The Pump unit according to claim 1, further comprising a pumping section where the fluid is subjected to the pumping force during operation of the pump unit, wherein at least a portion of the duct extends between the reservoir and the pumping section.

3. The pump unit according to claim 1 or 2, which is adapted to allowing for the initial filling of the at least a portion of the duct with the fluid based on a capillary force.

4. The Pump unit according to claim 3, wherein the duct is locally restricted.

5. The Pump unit according to claim 4, wherein, at a length along which the duct is locally restricted, the duct comprises at least two subducts.

6. The Pump unit according to claim 3, wherein material of the duct is a material with which the fluid has a better wetting than wetting of surrounding material.

7. The Pump unit according to claim 1, wherein the wetting means further comprise a layer of a material that has a better wetting with the fluid than wetting of surrounding material, and that is applied to an inner surface of the duct.

8. The Pump unit according to claim 1, wherein a configuration of the reservoir and the duct allows for the initial filling of the at least a portion of the duct with the fluid based on gravity.

9. The Pump unit according to claim 8, wherein at least an upper portion of the reservoir is positioned at a higher level than at least a portion of the duct.

10. The Pump unit according to claim 1, adapted to preventing leaking away of fluid from the duct system after the initial filling has taken place.

11. The Pump unit according to claim 10, wherein a level of an outlet of the duct system is higher than a maximum level of fluid in the reservoir.

12. The Pump unit according to claim 10, further comprising a substrate in which the duct system is arranged, wherein a portion of the substrate surrounding an outlet of the duct system comprises a material with which the fluid has a poorer wetting than wetting of surrounding material.

13. The Pump unit according to claim 10, further comprising a substrate in which the duct system is arranged, wherein a portion of the substrate surrounding an outlet of the duct system is covered by a layer of a material that has a poorer wetting with the fluid than wetting of surrounding material.

14. The Pump unit according to claim 13, wherein the layer of the material that has the poorer wetting with the fluid is part of a removable seal for sealing the outlet of the duct system.

15. The Pump unit according to claim 10, wherein a ring-shaped portion of an inner surface of at least one of the ducts of the duct system is covered by a layer of a material that has poorer wetting with the fluid than wetting of surrounding material.

16. The Pump unit according to claim 10, further comprising a removably arranged obstructions, which is adapted to remain in place when the further force is exerted during the initial filling, and which is adapted to being removed under influence of the pumping force.

17. The Pump unit according to claim 16, further comprising a valve door which is pivotably arranged inside the duct system.

18. The Pump unit according to claim 10, further comprising an obstruction which is adapted to dissolving when its temperature exceeds a threshold which is above the temperature of the fluid that is supplied during the initial filling.

19. A pump unit for use in a beverage maker, comprising:
a reservoir for containing a fluid;
a duct system having at least one duct which is connected to the reservoir, and which is adapted to conveying the fluid under influence of a pumping force; wherein the pump unit is adapted to allowing for an initial filling of at least a portion of the duct with the fluid based on a further force other than the pumping force, wherein the duct system comprises at least two ducts for conveying the fluid, which are joined at a certain position in the pump unit.

20. The Pump unit according to claim 19, wherein the reservoir is adapted to containing a liquid, wherein the duct that is connected to the reservoir is adapted to conveying the liquid, and wherein another duct is adapted to conveying steam.

21. A pump unit for use in a beverage maker, comprising:
a duct system having at least one duct for conveying a fluid under influence of a pumping force; wherein the pump unit is adapted to preventing leaking away of fluid from the duct system; and
wetting means adapted to ensuring wetting of the fluid with the duct, wherein the wetting means comprise means for causing an electro-wetting effect between the fluid and the duct by applying a voltage.

22. The Pump unit according to claim 21, further comprising a reservoir for containing the fluid, wherein a level of an outlet of the duct system is higher than a maximum level of fluid in the reservoir.

23. The Pump unit according to claim 21, comprising a substrate in which the duct system is arranged, wherein a portion of the substrate surrounding an outlet of the duct system comprises a material with which the fluid has a poorer wetting than wetting of surrounding material.

24. The Pump unit according to claim 21, comprising a substrate in which the duct system is arranged, wherein a portion of the substrate surrounding an outlet of the duct system is covered by a layer of a material that has a poorer wetting with the fluid than wetting of surrounding material.

25. The Pump unit according to claim 24, wherein the layer of the material that has the poorer wetting with the fluid is part of a removable seal for sealing the outlet of the duct system.

26. The Pump unit according to claim 21, wherein a ring-shaped portion of an inner surface of at least one of the ducts of the duct system is covered by a layer of a material that has a poorer wetting with the fluid than wetting of surrounding material.

27. The Pump unit according to claim 21, comprising an obstruction which is adapted to being removed under influence of the pumping force.

28. The Pump unit according to claim 27, comprising a valve door which is pivotably arranged inside the duct system.

29. The Pump unit according to claim 21, comprising an obstruction which is adapted to dissolving when its temperature exceeds a threshold that is above ambient temperature.

30. A cartridge for use in a beverage maker, comprising the pump unit according to claim 1.

31. The cartridge according to claim 30, which is adapted to being used as a disposable.

32. A beverage maker, comprising the pump unit according to claim 1, wherein the pump unit is an integral part of the beverage maker.

33. The beverage maker, comprising a space for receiving a cartridge according to claim 30.

* * * * *